United States Patent
Lu et al.

(10) Patent No.: US 10,774,172 B2
(45) Date of Patent: *Sep. 15, 2020

(54) CRYSTALLINE HIGH MODULUS THERMOPLASTIC POLYURETHANE

(71) Applicant: Lubrizol Advanced Materials, Inc., Cleveland, OH (US)

(72) Inventors: Qiwei Lu, Sugar Land, TX (US); Julius Farkas, North Ridgeville, OH (US); Chetan M. Makadia, Strongsville, OH (US); Alexander Jiaokai Jing, Hudson, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/772,545

(22) PCT Filed: Nov. 1, 2016

(86) PCT No.: PCT/US2016/059812
§ 371 (c)(1),
(2) Date: May 1, 2018

(87) PCT Pub. No.: WO2017/079101
PCT Pub. Date: May 11, 2017

(65) Prior Publication Data
US 2019/0085117 A1 Mar. 21, 2019

Related U.S. Application Data

(60) Provisional application No. 62/251,724, filed on Nov. 6, 2015.

(51) Int. Cl.
| | | |
|---|---|---|
| *C08G 18/48* | (2006.01) |
| *C08G 18/32* | (2006.01) |
| *C08K 3/40* | (2006.01) |
| *C08G 18/76* | (2006.01) |
| *C08G 18/66* | (2006.01) |
| *C08G 18/42* | (2006.01) |
| *C08J 3/20* | (2006.01) |
| *C08K 5/5313* | (2006.01) |
| *C08K 7/14* | (2006.01) |
| *C08K 13/02* | (2006.01) |
| *B29C 48/00* | (2019.01) |
| *B29K 75/00* | (2006.01) |
| *B29K 105/00* | (2006.01) |

(52) U.S. Cl.
CPC ..... *C08G 18/7671* (2013.01); *C08G 18/3206* (2013.01); *C08G 18/4238* (2013.01); *C08G 18/4854* (2013.01); *C08G 18/664* (2013.01); *C08G 18/6607* (2013.01); *C08G 18/6674* (2013.01); *C08G 18/6681* (2013.01); *C08J 3/201* (2013.01); *C08K 3/40* (2013.01); *C08K 5/5313* (2013.01); *C08K 7/14* (2013.01); *C08K 13/02* (2013.01); *B29C 48/022* (2019.02); *B29K 2075/00* (2013.01); *B29K 2105/0026* (2013.01); *C08G 2250/00* (2013.01)

(58) Field of Classification Search
CPC .... C08G 18/76; C08G 18/4825; C08G 18/34; C08K 3/016; C08K 3/40; C08K 7/02; C08K 5/49
See application file for complete search history.

(56) References Cited

U.S. PATENT DOCUMENTS

| 4,376,834 A * | 3/1983 | Goldwasser ........... C08G 18/10 521/159 |
| 5,225,476 A * | 7/1993 | Sperk, Jr. ................. C08K 7/02 524/507 |
| 5,519,094 A * | 5/1996 | Tseng ....................... C08L 67/02 525/440.01 |
| 5,627,254 A | 5/1997 | Oriani |
| 5,962,617 A | 10/1999 | Slagel |
| 6,995,231 B2 | 2/2006 | Onder |
| 9,650,514 B2 * | 5/2017 | Lu ....................... C08G 18/4277 |
| 2010/0222524 A1 | 9/2010 | Lawrey et al. |
| 2016/0083560 A1 * | 3/2016 | Fudala ..................... C08K 3/32 524/101 |
| 2016/0145375 A1 * | 5/2016 | Farkas ................. C08G 18/664 528/80 |
| 2016/0311964 A1 * | 10/2016 | Marin ................. C08G 18/4854 |
| 2018/0319925 A1 * | 11/2018 | Lu ......................... C08K 5/5313 |

FOREIGN PATENT DOCUMENTS

| EP | 0080031 A1 | 6/1983 |
| WO | 2014086830 | 6/2014 |
| WO | 2014210098 | 12/2014 |
| WO | 2015088734 | 6/2015 |

\* cited by examiner

*Primary Examiner* — Rip A Lee
(74) *Attorney, Agent, or Firm* — Eryn Ace Fuhrer; Teresan W. Gilbert

(57) ABSTRACT

A crystalline non-reinforced thermoplastic polyurethane composition having a high flexural modulus comprises 5% to 25% of a hydroxyl-functional polyol intermediate having a weight average molecular weight of 250 to 3000 and 75% to 95% hard segment comprising an unbranched, unsubstituted, linear chain diol and an aromatic isocyanate.

10 Claims, No Drawings

CRYSTALLINE HIGH MODULUS THERMOPLASTIC POLYURETHANE

CROSS REFERENCE TO RELATED APPLICATION

This application claims priority from PCT Application Serial No. PCT/US2016/059812 filed on Nov. 1, 2016, which claims the benefit of U.S. Provisional Application No. 62/251,724 filed on Nov. 6, 2015, the entirety of both of which is hereby incorporated by reference.

FIELD OF THE INVENTION

The present invention relates to non-reinforced thermoplastic polyurethane (TPU) compositions which have high crystallinity and high flexural modulus, which can be further compounded and also can be used in injection molding processes.

BACKGROUND OF THE INVENTION

Often, applications where engineering grade TPUs are used also involve exposure to high temperatures. Current commercially available rigid, engineering TPUs are generally limited to applications below 120° C. because the TPU will start to soften or depolymerize and thus lose useful properties at temperatures at or above the TPU's glass transition temperature (Tg). In addition, current commercially available rigid engineering TPUs are difficult to compound with other materials, e.g. flame retardants, to form TPU compounds with high flexural modulus as well as maintaining other beneficial properties associated with TPU. It is therefore desirable to have a rigid TPU material to be used in engineering applications that is both crystalline and has a high flexural modulus. Further, it would be beneficial to have a crystalline rigid engineering TPU material that can withstand higher temperatures and be easily processed and compounded with other additives and/or polymers.

SUMMARY OF THE INVENTION

The present invention relates to a highly crystalline, rigid, engineering thermoplastic polyurethane resin having a high flexural modulus. One embodiment of the invention provides a rigid engineering thermoplastic polyurethane which has high flexural modulus that can be easily compounded with flame retardant additives and/or other polymers or additives.

The crystalline thermoplastic polyurethane composition of the present invention comprises the reaction product of (a) about 5% by weight to about 25% by weight of a polyol component, wherein the polyol has a weight average molecular weight of about 250 to about 3000; (b) about 75% by weight to about 95% by weight of a hard segment component, wherein the hard segment component comprises (i) an aromatic polyisocyanate and (ii) a chain extender comprising an unbranched, unsubstituted, linear chain diol; and (c) optionally, a catalyst.

Thermoplastic polyurethane compositions of the present invention have a flexural modulus of about 230,000 psi or higher, or 250,000 psi or higher, or even 300,000 psi or higher as measured by ASTM D790. In addition to having a high flexural modulus, the thermoplastic polyurethane compositions of the present invention are also crystalline meaning that the compositions have melting points (Tm) of 150° C., or even 175° C. or higher as measured by differential scanning calorimetry or crystallization temperatures (Tc) in the range of 125° C.-150° C. as measured by (DSC) and have high storage moduli (G' Modulus) of at least 10 MPa or higher, or even 15 MPa or higher as measured by dynamic mechanical analysis (DMA) at 150° C.

Another embodiment of the invention provides a crystalline thermoplastic polyurethane composition as described above further comprising a flame retardant additive.

Another embodiment of the invention provides a flame retardant crystalline thermoplastic polyurethane composition as described above further comprising a flame retardant additive, wherein the flame retardant additive comprises an aluminum salt of phosphinic acid represented by the formula: $[R^1R^2P(O)O]^-_3Al^{3+}$, an aluminum salt of diphosphinic acid represented by the formula: $[O(O)PR^1-R^3-PR^2(O)O]^{2-}_3Al^{3+}_2$, a polymer of one or more of the foregoing, or any combination thereof, wherein $R^1$ and $R^2$ are hydrogen and $R^3$ is an alkyl group.

Another embodiment of the invention provides an molded, extruded, or thermoformed article comprising a crystalline thermoplastic polyurethane as described above wherein the thermoplastic polyurethane composition has a flexural modulus measured according to ASTM D790 of at least 230,000 psi, for example at least 250,000 psi and melting points (Tm) of 150° C., or even 175° C. or higher as measured by DSC and/or crystallization temperatures (Tc) in the range of 125° C.-150° C. as measured by DSC, and/or storage moduli (G' Modulus) of at least 10 MPa or higher, or even 15 MPa or higher as measured by DMA at 150° C.

Another embodiment of the invention provides an molded, extruded, or thermoformed article comprising a crystalline thermoplastic polyurethane composition as described above and wherein the thermoplastic polyurethane is compounded with short glass fibers, and wherein the thermoplastic polyurethane composition has a flexural modulus measured according to ASTM D790 of at least 230,000 psi, for example at least 250,000 psi, further for example, at least 500,000 psi, even further for example, at least 1,000,000 psi.

Another embodiment of the invention provides a molded flame resistant article comprising a flame retardant crystalline thermoplastic polyurethane composition as described above further comprising a flame retardant additive, wherein the flame retardant additive comprises an aluminum salt of phosphinic acid represented by the formula: $[R^1R^2P(O)O]^-_3Al^{3+}$, an aluminum salt of diphosphinic acid represented by the formula: $[O(O)PR^1-R^3-PR^2(O)O]^{2-}_3Al^{3+}_2$, a polymer of one or more of the foregoing, or any combination thereof, wherein $R^1$ and $R^2$ are hydrogen and $R^3$ is an alkyl group, wherein the thermoplastic polyurethane composition has a V0 flame rating with non-dripping properties as measured by UL 94 vertical burn testing.

Other embodiments and details of the invention are set forth with particularity below.

DETAILED DESCRIPTION OF THE INVENTION

The thermoplastic polyurethanes of the present invention have a high crystalline content, high temperature resistance, high flexural modulus, and can be easily compounded with other additives, such as flame retardant additives.

The crystallization temperature of the composition can typically be determined by differential scanning calorimetery. Generally, crystallized compositions can be melted, solvated, or otherwise amorphized and then recrystallized.

The term crystallizable refers to compositions that are a) crystallized or b) uncrystallized, but capable of crystallization by an increase in temperature of the composition and subsequent cooling or by subsequent heating. As used herein the term "crystalline" refers to both crystallized and crystallizable compositions. Crystalline thermoplastic polyurethanes in accordance with the present invention are characterized by a storage modulus (G' modulus) of at least 10 MPa or higher, or even 15 MPa or higher as measured by dynamic mechanical analysis (DMA) at 150° C., and/or melting points (Tm) of 150° C., or even 175° C. or higher as measured by differential scanning calorimetry (DSC) and/or crystallization temperatures (Tc) in the range of 125° C.-150° C. as measured by DSC.

In one embodiment of the invention, the crystalline thermoplastic polyurethane composition comprises at least 75%, for example 75% to 95% hard segment. Hard segment content can be defined as equal to the total of the weight percent of the isocyanate component and chain extender component divided by the total weight percent of the thermoplastic polyurethane composition (weight percent of isocyanate component, chain extender, and polyol component).

The thermoplastic polyurethanes of the present invention are generally prepared by combining and reacting (a) a polyol component comprising at least one hydroxyl terminated intermediate, such as a hydroxyl terminated polyester, hydroxyl terminated polyether, hydroxyl terminated polycarbonate, or hydroxyl terminated polycaprolactone with (b) at least one aromatic polyisocyanate component, and (c) at least one chain extender, wherein the chain extender comprises an unbranched, unsubstituted, linear chain diol, and optionally a catalyst. These reactants generate a thermoplastic polyurethane in, for example, an extruder or other reaction vessel.

The components of the high crystalline content polyurethane composition can be combined to form the polyurethane composition prior to compounding or they can be combined in situ within the extruder during compounding.

Polyols

The thermoplastic polyurethanes of the present invention include a polyol component. The polyol component may be selected from hydroxyl terminated polyesters or hydroxyl terminated polyethers having weight average molecular weights of 250 to 3000.

Hydroxyl terminated polyesters generally are produced by, for example (1) an esterification reaction of one or more dicarboxylic acids or anhydrides using one or more glycols or (2) a transesterification reaction of one or more esters of dicarboxylic acids using one or more glycols. Mole ratios generally in excess of more than one mole of glycol to acid, anhydride, or ester are preferred so as to obtain linear chains having a preponderance of terminal hydroxyl groups.

Dicarboxylic acids for preparing hydroxyl terminated polyester intermediates include aliphatic, cycloaliphatic, and aromatic dicarboxylic acids. A single dicarboxylic acid or a combination of dicarboxylic acids can be used. Typically, the dicarboxylic acids have a total of from 4 to about 15 carbon atoms. Examples of suitable dicarboxylic acids include succinic, glutaric, adipic, pimelic, suberic, azelaic, sebacic, dodecanedioic, isophthalic, terephthalic, and anhydrides such as phthalic anhydride, tetrahydrophthalic anhydride, and the like can also be used. Adipic acid is a commonly used dicarboxylic acid.

If the transesterification route for formation of the hydroxyl terminated polyester is utilized, esters of the dicarboxylic acids described above can be used. These esters typically include an alkyl group, usually having 1 to 6 carbon atoms, in place of the acidic hydrogen of the corresponding acid functionalities.

The glycols which are reacted for form the hydroxyl terminated polyester intermediate can be aliphatic, aromatic, or combinations thereof. The glycols typically have a total of from 2 to 12 carbon atom. Suitable glycols include, for example, ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexane dimethanol, decamethylene glycol, dodecamethylene glycol, and the like. Commonly used glycols are 1,4-butanediol and 1,6-hexanediol.

The class of hydroxyl terminated polyether polyols are derived from a diol or polyol having a total of from 2 to about 15 carbon atoms. For example, an alkyl diol or glycol can be reacted with an ether, such as an alkylene oxide having from 2 to 6 carbon atom. Suitable alkylene oxides include, for example, ethylene oxide, propylene oxide, or mixtures thereof.

Polyether polyols include, for example, poly(ethylene glycol) which can be formed by reacting ethylene oxide with ethylene glycol, poly(propylene glycol) which can be formed by reacting propylene oxide with propylene glycol, poly(propylene-ethylene glycol) which can be formed by reacting propylene oxide and ethylene oxide with propylene glycol, poly(tetramethylene glycol) (PTMEG) which can be formed by polymerization of tetrahydrofuran (THF). Other suitable polyether polyols include polyamide adducts of an alkylene oxide including, for example, ethylenediamine adduct which is the reaction product of ethylenediamine and propylene oxide, diethylenetriamine adduct which is the reaction product of diethylenetriame with propylene oxide, and similar polyamide type polyether polyols.

In one useful embodiment, the weight average molecular weight of the polyol component of the present invention, which can comprise polyols as defined above, is from about 250 to about 3,000, for example, about 250 to about 2,000, and even further for example, from about 400 to about 1,000. The average hydroxyl functionality of the polyol component is about 1.8 to about 2.2, for example, about 1.95 to about 2.00 or 2.05. The polyol component is utilized in the thermoplastic polyurethane composition of the present invention in amounts so that the hydroxyl group content is generally from about 2 to about 70 equivalents, for example, about 3 to about 65 equivalents, and even further for example about 5 or 10 to about 50 or 60 equivalents per 100 equivalents of the total hydroxyl groups present in the thermoplastic polyurethane composition. In one exemplary embodiment of the invention, the crystalline thermoplastic polyurethane composition of the invention comprises or consists of 5% to 10% by weight polyether polyol, for example PTMEG, having a weight average molecular weight of 250 to 3000. In another exemplary embodiment, the crystalline thermoplastic polyurethane of the invention comprises or consists of 20% by weight polyester polyol, such as butane diol-adipate, having a weight average molecular weight of 400 to 1000. In adnother exemplary embodiment, the crystalline thermoplastic polyurethane of the invention comprises a mixture of polyether and polyester polyols as the polyol component.

Polyisocyanates

The polyurethanes of the present invention are derived from an aromatic isocyanate compound, in particular an aromatic diisocyanate. Examples of aromatic polyisocyanates include, but are not limited to 4,4'-methylenebis(phenyl isocyanate) (MDI), m-xylene diisocyanate (XDI), phenylene-1,4-diisocyanate, naphthalene-1,5-diisocyanate, and toluene diisocyanate (TDI). Mixtures of two or more aromatic polyisocyanates may be used. In some embodiments, the polyisocyanate comprises, or consists essentially of, or consists of MDI.

Chain Extenders

Chain extenders are desirably employed in the polyurethane formulations of the present invention to increase the molecular weight thereof. They are also responsible for formation of crystalline hard blocks leading to thermoplastic polyurethanes with desirable mechanical properties. In one useful embodiment, the chain extender is an unbranched, unsubstituted, linear chain glycol, which would not retard crystallization during TPU formation. Suitable chain extenders are lower aliphatic or short chain glycols having from about 2 to about 12 carbon atoms, for example, about 2 to about 9 carbon atoms. Useful chain extenders include for instance ethylene glycol, 1,3-propanediol, 1,4-butanediol, 1,6-hexandiol, 1,5-pentanediol, 1,9-nonane diol, and 1,12 dodecanediol, 1,4-di(2-hydroxyethoxy) benzene (HQEE).

In some embodiments, a co-chain extender may be employed to balance other desired properties of the thermoplastic polyurethane composition, provided that the co-chain extender does not affect the crystallinity of the thermoplastic polyurethane composition. Co-chain extenders may include non-linear chain extenders such as 1,3-butanediol, cyclohexane dimethanol (CHDM), dipropylene glycol, and 3-methyl-1-5-pentadiol (MPD). Other co-chain extenders known to those of ordinary skill in the art which can aid in balancing processing properties without negatively affecting crystallinity may also be used.

Catalysts

Optionally, catalysts are used in the polyurethane reaction mixtures of the present invention. Any of the catalysts conventionally employed or known in the art to catalyze the reaction of an isocyanate with a reactive hydrogen containing compound can be employed for this purpose. Examples of suitable catalysts which in particular accelerate the reaction between the NCO groups of the diisocyanates and the hydroxy groups of the polyols and chain extenders are the conventional tertiary amines known from the prior art, e.g. triethylamine, dimethylcyclohexylamine, N-methylmorpholine, N,N'-dimethylpiperazine, 2-(dimethyl aminoethoxy) ethanol, diazabicyclo[2.2.2]octane and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like. Mixtures of the above noted catalysts can likewise be used.

TPU compositions of the present invention are formed from the reaction of (a) a polyol component, (b) a hard segment component comprising an aromatic polyisocyanate and a chain extender comprising an unbranched, unsubstituted, linear chain diol, and (c) optionally, a catalyst. In some embodiments, the reaction comprises about 5% by weight to about 25% by weight, for example, about 5% by weight to about 10% by weight, or about 20% by weight the polyol component. The polyol component may be selected from any of polyols described herein, including polyester polyols and polyether polyols. In some embodiments of the invention, the reaction comprises about 75% by weight to about 95% by weight, for example 90% to about 95%, or about 80% by weight of the hard segment component. In one embodiment, the hydroxyl terminated intermediate consists of PTMEG. In another embodiment, the hydroxyl terminated intermediate consists of butane diol adipate. In some embodiments, the hard segment component consists essentially of an aromatic diisocyanate and a unbranched, unsubstituted, linear chain glycol. In one embodiment, the chain extender consists of 1,4-butane diol. In some embodiments, the aromatic diisocyanate consists essentially of or consists of MDI. If included in the reaction, in some embodiments of the invention, the reaction mixture may include less than 20 parts by weight per million parts by weight of the total weight of the polyisocyanate(s), polyol(s), and chain extender(s) of a catalyst. In other embodiments, the reaction mixture is substantially free of catalysts. As used herein, "substantially free of" with respect to the catalysts means less than 15 parts by weight per million parts by weight of the total weight of the polyisocyanate(s), polyol(s), and chain extender(s). In other embodiments, the reaction mixture is completely free of catalysts.

The three reactants (the polyol intermediate, the aromatic diisocyanate, and the chain extender) are reacted together to form the TPU of this invention. Any known processes to react the three reactants may be used to make the TPU. In one embodiment, the process is a so-called "one-shot" process where all three reactants are added to an extruder reactor and reacted. The equivalent weight amount of the diisocyanate to the total equivalent weight amount of the hydroxyl containing components, that is, the polyol intermediate and the chain extender glycol, can be from about 0.95 to about 1.10, or from about 0.96 to about 1.02, and even from about 0.97 to about 1.005. Reaction temperatures utilizing a urethane catalyst can be from about 175 to about 245° C., and in another embodiment from 180 to 220° C.

The TPU can also be prepared utilizing a pre-polymer process. In the pre-polymer route, the polyol intermediates are reacted with generally an equivalent excess of one or more diisocyanates to form a pre-polymer solution having free or unreacted diisocyanate therein. The reaction is generally carried out at temperatures of from about 80 to about 220° C., or from about 150 to about 200° C., optionally, in the presence of a suitable urethane catalyst. Subsequently, a chain extender, as noted above, is added in an equivalent amount generally equal to the isocyanate end groups as well as to any free or unreacted diisocyanate compounds. The overall equivalent ratio of the total diisocyanate to the total equivalent of the polyol intermediate and the chain extender is thus from about 0.95 to about 1.10, or from about 0.96 to about 1.02 and even from about 0.97 to about 1.05. The chain extension reaction temperature is generally from about 180 to about 250° C. or from about 200 to about 240° C. Typically, the pre-polymer route can be carried out in any conventional device including an extruder. In such embodiments, the polyol intermediates are reacted with an equivalent excess of a diisocyanate in a first portion of the extruder to form a pre-polymer solution and subsequently the chain extender is added at a downstream portion and reacted with the pre-polymer solution. Any conventional extruder can be utilized, including extruders equipped with barrier screws having a length to diameter ratio of at least 20 and in some embodiments at least 25.

In one embodiment, the ingredients are mixed on a single or twin screw extruder with multiple heat zones and multiple feed ports between its feed end and its die end. The ingredients may be added at one or more of the feed ports and the resulting TPU composition that exits the die end of the extruder may be pelletized.

The preparation of the various polyurethanes in accordance with conventional procedures and methods and since as noted above, generally any type of polyurethane can be utilized, the various amounts of specific components thereof, the various reactant ratios, processing temperatures, catalysts in the amount thereof, polymerizing equipment such as the various types of extruders, and the like, are all generally conventional, and well as known to the art and to the literature.

The described process for preparing the TPU of the invention includes both the "pre-polymer" process and the "one shot" process, in either a batch or continuous manner. That is, in some embodiments the TPU may be made by reacting the components together in a "one-shot" polymerization process wherein all of the components, including reactants are added together simultaneously or substantially simultaneously to a heated extruder and reacted to form the TPU. While in other embodiments the TPU may be made by first reacting the polyisocyanate component with some portion of the polyol component forming a pre-polymer, and then completing the reaction by reacting the pre-polymer with the remaining reactants, resulting in the TPU.

After exiting the extruder, the composition is normally pelletized and stored in moisture proof packaging and is ultimately sold in pellet form. It being understood that the composition would not always need to be pelletized, but rather could be extruded directly from the reaction extruder through a die into a final product profile.

Various types of optional components/additives can be present during the polymerization reaction, and/or incorporated into the TPU elastomer described above to improve processing and other properties. These additives include but are not limited to antioxidants, such as phenolic types, organic phosphites, phosphines and phosphonites, hindered amines, organic amines, organo sulfur compounds, lactones and hydroxylamine compounds, biocides, fungicides, antimicrobial agents, compatibilizers, electro-dissipative or anti-static additives, fillers and reinforcing agents, such as titanium dixide, alumina, clay and carbon black, flame retardants, such as phosphates, halogenated materials, and metal salts of alkyl benzenesulfonates, impact modifiers, such as methacrylate-butadiene-styrene ("MBS") and methylmethacrylate butylacrylate ("MBA"), mold release agents such as waxes, fats and oils, pigments and colorants, plasticizers, polymers, rheology modifiers such as monoamines, polyamide waxes, silicones, and polysiloxanes, slip additives, such as paraffinic waxes, hydrocarbon polyolefins and/or fluorinated polyolefins, and UV stabilizers, which may be of the hindered amine light stabilizers (HALS) and/or UV light absorber (UVA) types. Other additives may be used to enhance the performance of the TPU composition or blended product. All of the additives described above may be used in an effective amount customary for these substances. These additional additives can be incorporated into the components of, or into the reaction mixture for, the preparation of the TPU resin, or after making the TPU resin. In another process, all the materials can be mixed with the TPU resin and then melted or they can be incorporated directly into the melt of the TPU resin.

In some embodiments, the TPU composition of the present invention further comprises a flame-retardant component, such as a flame-retardant additive. The flame retardants may be, but are not necessarily, intumescent. Examples include phenylbisdodecyl phosphate, phenylbisneopentyl phosphate, phenyl ethylene hydrogen phosphate, phenylbis-3,5,5'-trimethylhexyl phosphate), ethyldiphenyl phosphate, 2-ethylhexyl di(p-tolyl) phosphate, diphenyl hydrogen phosphate, bis(2-ethyl-hexyl) p-tolylphosphate, tritolyl phosphate, bis(2-ethylhexyl)-phenyl phosphate, tri(nonylphenyl) phosphate, phenylmethyl hydrogen phosphate di(dodecyl) p-tolyl phosphate, tricresyl phosphate, triphenyl phosphate, dibutylphenyl phosphate, p-tolyl bis(2,5,5'-trimethylhexyl) phosphate, 2-ethylhexyldiphenyl phosphate, and diphenyl hydrogen phosphate. Other flame retardants include bisphenol-A bis(diphenyl phosphate), resorcinol bis (diphenyl phosphate), and cresol bis(diphenyl phosphate).

Further examples of flame retardants include a brominated organic compound, for example, a brominated diol. It may contain from 5 to 20 carbon atoms, and in some embodiments 5 to 10, or even 5 carbon atoms, and may contain a quaternary carbon atom. The additive may be present in an amount sufficient to provide the desired flame retardancy, and in other embodiments may be present from 0 to 15 percent by weight of the overall composition, or even from 0 to 10, from 0.1 to 7, or from 0.2 to 5 percent by weight of the overall composition.

Other examples of flame-retardants include brominated organic compounds. Suitable examples include brominated diols, brominated mono-alcohols, bromimated ethers, brominated esters, brominated phosphates, and combinations thereof. Suitable brominated organic compounds may include tetrabromobisphenol-A, hexabromocyclododecane, poly (pentabromobenzyl acrylate), pentabromobenzyl acrylate, tetrabromobisphenol A-bis(2,3-dibromopropyl ether), tribromophenol, dibromoneopentyl glycol, tribromoneopentyl alcohol, tris(tribromoneopentyl) phosphate, and 4,4'-isopropylidenebis[2-(2,6-dibromophenoxy)ethanol].

In some embodiments, the flame retardant additive includes a metal salt of a halogen borate, metal salt of halogen phosphate, or a combination thereof. In some embodiments, combinations of retardants are used. Additional examples of flame retardant additives include a metal salt of organic sulfonate, for example, a sodium salt of an alkyl benzene sulfonate and in some embodiments, the flame retardant additive includes a nitrogen-containing compound.

Flame-retardant additives may also include a boron phosphate flame-retardant, a dipentaerythritol, a phosphate salt flame-retardant, a phosphate ester flame-retardant, an aromatic phosphate flame-retardant, or any combination thereof. In some embodiments, this additional flame-retardant may include a boron phosphate flame-retardant, a dipentaerythritol, or any combination thereof. A suitable example of a boron phosphate flame-retardant is BUDIT 326, commercially available from Budenheim USA, Inc. In some embodiments, this additional flame-retardant may include a phosphate ester flame-retardant.

In one embodiment, the flame-retardant component comprises a phosphinate. Examples of such materials include salts of phosphinic acids and/or diphosphinic acids or polymeric derivatives thereof. These compounds are referred to herein as phosphinates and/or metal phosphinates. In some embodiments, the phosphinate component of the invention includes a metal salt of phosphinic acid represented by the formula: [R1R2P(O)O]-mMm+, a metal salt of diphosphinic acid represented by the formula: [O(O)PR1-R3-PR2(O)O] 2-nMxm+, a polymer of one or more thereof, or any combination thereof, wherein: R1 and R2 are hydrogen; R3 is an alkyl group (containing 1 to 4 or even 1 carbon atoms); M is a metal chosen from the group consisting of Mg, Ca, Al, Sb, Sn, Ge, Ti, Zn, Fe, Zr, Ce, Bi, Sr, Mn, Li, Na, and K; and m, n and x are each independently equal or different integers in the range of 1 4. In some embodiments, the phosphinate component comprises aluminum phosphinate. In some embodiments, the phosphinate component comprises a combination of aluminum phosphinate along with one or more other metal phosphinates as listed above. Suitable phosphinates that can be used in the present invention are also described in DE A 2 252 258, DE-A 2 447 727, PCT/W-097/39053 and EP 0932643 B1. Various phosphinate based flame-retardants are commercially available including, but not limited to DP 111, an aluminum phosphinate based flame-retardant from JJI Technologies, Phoslite B85AX aluminum phosphinate based flame-retardant, Phoslite® B65AM aluminum phosphinate based flame-retardant and Phoslite B85CX calcium phosphinate based flame-retardant all from Italmatch.

When present, the flame-retardant component may be present in an amount from 0 to 30 weight percent of the overall TPU composition, in other embodiments from 0.5 to 30, or from 10 to 30, or from 0.5 or 1 to 10, or from 0.5 to 5, or even from 1 to 3 weight percent of the overall TPU composition.

Suitable aromatic phosphate flame-retardants include monophosphates with aromatic groups, diphosphates with aromatic groups, triphosphates with aromatic groups, or any combination thereof. In some embodiments, the aromatic phosphate flame-retardant includes one or more diphosphates with aromatic groups. Examples of such materials include bisphenol A diphosphate.

Suitable examples of compounds that may be used as, or used in combination with, the aromatic phosphate flame-retardant of the invention include triaryl phosphate, polyaryl phosphate esters, such as triphenyl phosphate, tricresyl phosphate, trixylyl phosphate, cresyl diphenyl phosphate, diphenyl xylyl phosphate, 2-biphenylydiphenyl phosphate, alkylated polyaryl phosphate esters such as butylated triphenyl phosphate, t-butylphenyl diphenyl phosphate, bis(t-butyl)phenyl phosphate, tris(t-butylphenyl) phosphate, tris(2,4-di-t-butylphenyl)phosphate, isopropylated triphenyl phosphates, isopropylated t-butylated triphenyl phosphates, t-butylated triphenyl phosphates, isopropylphenyl diphenyl phosphate, bis(isopropylphenyl) phenyl phosphate (3,4-diisopropylphenyl) diphenyl phosphate, tris(isopropylphenyl) phosphate, (1-methyl-1-phenylethyl)phenyl diphenyl phosphate, nonylphenyl diphenyl phosphate, 4-[4-hydroxyphenyl(propane-2,2-diyl)]phenyl diphenyl phosphate, 4-hydroxyphenyl diphenyl phosphate, resorcinol bis(diphenyl phosphate), bisphenol A bis(diphenyl phosphate), bis(ditolyl)isopropylidenedi-p-phenylene bis(phosphate), O,O,O', O'-tetrakis(2,6-dimethylphenyl)-O,O'-m-phenylene bisphosphate, alkyl aryl phosphate esters such as 2-ethylhexyl diphenyl phosphate, isodecyl diphenyl phosphate, diethyl phenethylamidophosphate, diisodecyl phenyl phosphate, dibutyl phenyl phosphate, methyl diphenyl phosphate, butyl diphenyl phosphate, diphenyl octyl phosphate, isoctyl diphenyl phosphate, isopropyl diphenyl phosphate, diphenyl lauryl phosphate, tetradecyl diphenyl phosphate, cetyl diphenyl phosphate, tar acids cresylic diphenyl phosphates, trialkyl phosphate esters, such as triethyl phosphate, tributyl phosphate, tri(butoxyethyl)phosphate, 3-(dimethylphosphono)propionic acid methylamide, pentaerythritol cyclic phosphate, and combinations thereof.

Suitable phosphate salt flame-retardants, which are different than those described above, include metal salts of phosphoric acid, phosphorous acid, hypophosphorous acid, amine phosphate, or a combination thereof. The phosphate compound in the mixture may include piperazine pyrophosphate, piperazine polyphosphate, or any combinations thereof. In some embodiments, the phosphate salt flame-retardant further comprises a zinc oxide component. The zinc oxide is not believed to react with the other components of the phosphate salt flame-retardant however, in some embodiments, it is contemplated that the zinc oxide, when present, does not react appreciably with the other components in the phosphate salt flame-retardant.

In one embodiment, the crystalline thermoplastic polyurethane composition is a flame retardant composition wherein the composition is substantially free of or totally free of halogen atoms.

An impact modifier may optionally be added to the TPU compositions described above and are added in an effective amount to improve the impact resistance and especially the low temperature toughness of the polyurethane. By improvement of low temperature toughness, it is meant that the Izod impact strength at −30° C. can be improved according to ASTM D256. Another improvement is that melt processability is improved such that the shear viscosity of the polyurethane is reduced as a result of a lowering of the melt processing temperature and further that this reduction is achieved without causing a non-cohesive external skin to form on a heat formed product.

In an embodiment, the impact modifier contains both a rubbery component and a grafted rigid phase component. Preferred impact modifiers are prepared by grafting a (meth) acrylate and/or vinyl aromatic polymer, including copolymers thereof such as styrene/acrylonitrile, onto the selected rubber. In an embodiment, the graft polymer is a homo- or copolymer of methylmethacrylate. The rubber material can be, for example, one or more of the well-known butadiene-, butyl acrylate-, or EPDM-types. In various embodiments, the impact modifier will contain at least about 40 weight percent of the rubber material, or at least about 45 and in another at least about 60 weight percent of the rubber material. The impact modifier can contain up to 100 weight percent rubber (no rigid phase) and in an embodiment contains less than 95 weight percent of the rubber material, and in another embodiment less than 90 weight percent of the rubber material with the balance being a rigid phase polymer of which at least a significant portion is graft polymerized and/or crosslinked around or to the rubber material.

Examples of impact modifiers include but are not limited to methacrylate-butadiene-styrene ("MBS") rubbers such as Paraloid EXL 3607 and methylmethacrylate butylacrylate ("MBA") rubbers such as Paraloid 3300 which rubbers generally contain 45-90 weight percent elastomer.

Another impact modifier which may be used contains as rubber material a substrate polymer latex or core which is made by polymerizing a conjugated diene, or by copolymerizing a conjugated diene with a mono-olefin or polar vinyl compound, such as styrene, acrylonitrile or methyl methacrylate. The substrate rubber is typically made up of about 45 to 100 percent conjugated diene and up to about 55 percent of the mono-olefin or polar vinyl compound. A mixture of monomers is then graft polymerized to the substrate latex. A variety of monomers may be used for this grafting purpose, including vinyl aromatic compounds such as styrene, vinyl toluene, α-methyl styrene, halogenated styrene, naphthalene; acrylonitriles including methacrylonitrile or a-halogenated acrylonitrile; or a C1-C8 alkyl (meth) acrylate such as methyl acrylate, ethylacrylate, hexyl acrylate, methyl methacrylate, ethyl methacrylate or hexyl methacrylate; an acrylic or methacrylic acid; or a mixture of two or more of the foregoing. The extent of grafting is sensitive to the substrate latex particle size and grafting reaction conditions, and particle size may be influenced by controlled coagulation techniques among other methods. The rigid phase may be crosslinked during the polymerization by incorporation of various polyvinyl monomers such as divinyl benzene and the like.

The impact modifier may be a carbonyl modified polyolefin. More specifically, it is a graft copolymer containing a polyolefin backbone with pendant carbonyl containing compounds. Based upon the entire weight of the graft copolymer, the amount of the polyolefin is from 90 percent to 99.9 percent, desirably from 93 percent to 98 percent, and preferably from 95 to 98 percent by weight. Suitable graft copolymers may have a melt index of from 1 to 20; in another embodiment from 1 to 10; and in yet another embodiment from 1 to 5.

The polyolefin component of the impact modifier (i.e. graft copolymer) is a homopolymer or a copolymer made from one or more monomers having from 2 to 6 carbon atoms; and desirably 2 or 3 carbon atoms. Specific examples of suitable polyolefins include the homopolymer of ethylene, propylene, or isobutylene, copolymers of propylene and ethylene, and of ethylene-propylene-diene monomers with the diene having from 4 to 8 carbon atoms. Suitable ethylene polymers for modification include high density polyethylene, low density polyethylene, and linear low density polyethylene. When a copolymer is utilized, the amount of the ethylene monomer utilized and hence the amount of the ethylene repeating unit in the copolymer can vary considerably as from 1 percent to 50 percent, in other cases from 3 percent to 25 percent, with approximately 10 percent being yet another embodiment.

In one embodiment, the impact modifier includes from 0.1 to 10 percent, in another embodiment from 0.2 to 7 percent, and in still another embodiment from 0.2 to 6 percent by weight of a carbonyl compound selected from, fumaric acid, maleic acid, or maleic anhydride.

The impact modifiers may be used in a range of 1 to 30 parts, and in some embodiments from 1 to 20, and in other embodiments from 5 to 15 parts by weight per 100 parts by weight of the polyurethane. The impact modifiers of the present invention are particularly useful when added to polyurethane blends which include a reinforcing agent and/or a filler. In the past, when a reinforcing agent has been added to polyurethane, the impact resistance, especially at low temperatures or at room temperature, has been poor as has been the melt processability of the resultant composite. Thus, the impact modifiers of the present invention are useful with reinforced polyurethanes to improve impact resistance, melt processability and to produce polyurethane composites having improved dimensional stability. By improved dimensional stability an improvement in one or more of the following characteristics is meant: flexural modulus, flexural strength, tensile yield strength and heat distortion temperature. When used with reinforced polyurethanes, the amount of the impact modifier can be the same as the amount used for unreinforced polyurethanes.

The described compositions include the TPU materials described above and also TPU compositions that include such TPU materials and one or more additional components. These additional components include other polymeric materials that may be blended with the TPU described herein. These additional components include one or more additives that may be added to the TPU, or blend containing the TPU, to impact the properties of the composition.

The TPU described herein may also be blended with one or more other polymers. The polymers with which the TPU described herein may be blended are not overly limited. In some embodiments, the described compositions include two or more of the described TPU materials. In some embodiments, the compositions include at least one of the described TPU materials and at least one other polymer, which is not one of the described TPU materials.

Polymers that may be used in combination with the TPU materials described herein also include more conventional TPU materials such as non-caprolactone polyester-based TPU, polyether-based TPU, or TPU containing both non-caprolactone polyester and polyether groups. Other suitable materials that may be blended with the TPU materials described herein include polycarbonates, polyolefins, styrenic polymers, acrylic polymers, polyoxymethylene polymers, polyamides, polyphenylene oxides, polyphenylene sulfides, polyvinylchlorides, chlorinated polyvinylchlorides, polylactic acids, or combinations thereof.

Polymers for use in the blends described herein include homopolymers and copolymers. Suitable examples include: (i) a polyolefin (PO), such as polyethylene (PE), polypropylene (PP), polybutene, ethylene propylene rubber (EPR), polyoxyethylene (POE), cyclic olefin copolymer (COC), or combinations thereof; (ii) a styrenic, such as polystyrene (PS), acrylonitrile butadiene styrene (ABS), styrene acrylonitrile (SAN), styrene butadiene rubber (SBR or HIPS), poly-α-methylstyrene, styrene maleic anhydride (SMA), styrene-butadiene copolymer (SBC) (such as styrene-butadiene-styrene copolymer (SBS) and styrene-ethylene/butadiene-styrene copolymer (SEBS)), styrene-ethylene/propylene-styrene copolymer (SEPS), styrene butadiene latex (SBL), SAN modified with ethylene propylene diene monomer (EPDM) and/or acrylic elastomers (for example, PS-SBR copolymers), or combinations thereof; (iii) a thermoplastic polyurethane (TPU) other than those described above; (iv) a polyamide, such as Nylon™, including polyamide 6,6 (PA66), polyamide 1,1 (PA11), polyamide 1,2 (PA12), a copolyamide (COPA), or combinations thereof; (v) an acrylic polymer, such as polymethyl acrylate, polymethylmethacrylate, a methyl methacrylate styrene (MS) copolymer, or combinations thereof; (vi) a polyvinylchloride (PVC), a chlorinated polyvinylchloride (CPVC), or combinations thereof; (vii) a polyoxyemethylene, such as polyacetal; (viii) a polyester, such as polyethylene terephthalate (PET), polybutylene terephthalate (PBT), copolyesters and/or polyester elastomers (COPE) including polyetherester block copolymers such as glycol modified polyethylene terephthalate (PETG), polylactic acid (PLA), polyglycolic acid (PGA), copolymers of PLA and PGA, or combinations thereof; (ix) a polycarbonate (PC), a polyphenylene sulfide (PPS), a polyphenylene oxide (PPO), or combinations thereof; or combinations thereof.

In some embodiments, these blends include one or more additional polymeric materials selected from groups (i), (iii), (vii), (viii), or some combination thereof. In some embodiments, these blends include one or more additional polymeric materials selected from group (i). In some embodiments, these blends include one or more additional polymeric materials selected from group (iii). In some embodiments, these blends include one or more additional polymeric materials selected from group (vii). In some embodiments, these blends include one or more additional polymeric materials selected from group (viii).

Other additives may include glass fibers. Useful glass fibers may be made from E, A or C glass and have preferably been provided with a size and with a coupling agent. Their diameter is generally from 6 to 20 μm. Use may be made either of continuous-filament fibers (rovings) or of chopped glass fibers (staple) whose length is from 1 to 10 mm, preferably from 3 to 6 mm. When compounded with the crystalline thermoplastic polyurethane composition of the present invention, the short glass fibers may comprise up to about 50% by weight of the total compounded composition, for example 10% to 50% by weight, further for example, 30% to 50% by weight.

All of the additives described above may be used in an effective amount customary for these substances. The non-flame retardants additives may be used in amounts of from about 0 to about 30 weight percent, in one embodiment from about 0.1 to about 25 weight percent, and in another embodiment about 0.1 to about 20 weight percent of the total weight of the TPU composition.

These additional additives can be incorporated into the components of, or into the reaction mixture for, the preparation of the TPU resin, or after making the TPU resin. In another process, all the materials can be mixed with the TPU resin and then melted or they can be incorporated directly into the melt of the TPU resin.

The TPU materials described above may be prepared by a process that includes the step of (I) reacting: a) the polyisocyanate component described above; b) the polyol component described above; and c) the chain extender component described above, where the reaction is optionally carried out in the presence of a catalyst, and where said catalyst comprises one or more compounds selected tin or iron compounds, resulting in a thermoplastic polyurethane composition.

The process may further include the step of: (II) mixing the TPU composition of step (I) with one or more blend components, including one or more additional TPU materials and/or polymers, including any of those described above.

The process may further include the step of: (II) mixing the TPU composition of step (I) with one or more of the additional additives described above.

The process may further include the step of: (II) mixing the TPU composition of step (I) with one or more blend components, including one or more additional TPU materials and/or polymers, including any of those described above, and/or the step of: (III) mixing the TPU composition of step (I) with one or more of the additional additives described above.

In some embodiments, the TPU composition of the present invention is substantially free of or even totally free of a crystallization retarding component. Crystallization retarding components are generally sterically hindered compounds which interrupt or delay crystallization during formation of the thermoplastic polyurethane. Crystallization retarding components include short chain or monomeric diols which are branched, substituted, and/or contain heteroatoms (atoms other than carbon). Crystallization retarding components include dipropylene glycol, cis-trans-isomers of cyclohexyl dimethylol, neopentyl glycol and substituted alkane diols such as 1,3 butanediol, and 2-methyl-2,4-pentane diol. Crystallization retarding components may also include branched or substituted alkane diols having from about 2 up to 12 carbon atoms in the main chain. Substituents include alkyl groups, cyclohexyl groups, aryl groups, and halogen atoms such as chlorine and bromine.

TPU compositions in accordance with the present invention have a high flexural modulus without the use of reinforcing additives or fillers. In one embodiment, the composition is free of reinforcing additives or fillers and has a flex modulus of greater than 230,000 psi as measured by ASTM D790. In some embodiments, the TPU compositions of the present invention have a flexural modulus of about 230,000 psi or higher, or even 250,000 psi of higher, or even than 300,000 psi or higher as measured by ASTM D790. In addition to having a high flexural modulus, the thermoplastic polyurethane compositions of the present invention are also crystalline, meaning that the compositions have melting points of 150° C., or even 175° C. or higher as measured by differential scanning calorimetry and/or crystallization temperatures (Tc) in the range of 125° C.-150° C. as measured by (DSC), and/or have high storage moduli (G' Modulus) of at least 10 MPa or higher, or even 15 MPa or higher as measured by dynamic mechanical analysis (DMA) at 150° C.

In some embodiments where the TPU composition is compounded with short glass fiber additives, the composition will have a flexural modulus of about 500,000 psi or higher, or even at 1,000,000 psi or higher as measured by ASTM D790. In some embodiments of the invention, the TPU composition may be compounded with a flame-retardant component or additive to form a flame-retardant TPU composition. Flame retardant compositions in accordance with the present invention preferably have, in addition to flame-retardant properties, high modulus and high heat deflection temperature. For flame-retardant properties, some embodiments of the invention have at least a V1 flame rating, or even a V0 flame rating with non-dripping properties as measured by UL 94 vertical burn testing.

The TPU compositions of the invention or any blends thereof may also be used to prepare the molded products of this invention in any molding process. The molding processes are well known to those of ordinary skill in the art and include but are not limited to, cast molding, cold forming matched-die molding, compression molding, foam molding, injection molding, gas-assisted injection molding, profile co-extrusion, profile extrusion, rotational molding, sheet extrusion, slush molding, spray techniques, thermoforming, transfer molding, vacuum forming, wet lay-up or contact molding, blow molding, extrusion blow molding, injection blow molding, and injection stretch blow molding or combinations thereof.

The compositions may be shaped into desirable end use articles by any suitable means known in the art. Thermoforming is a process of forming at least one pliable plastic sheet into a desired shape. An embodiment of a thermoforming sequence is described, however this should not be construed as limiting thermoforming methods useful with the compositions of this invention. First, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool.

Thermoforming is accomplished by vacuum, positive air pressure, plug-assisted vacuum forming, or combinations and variations of these, once the sheet of material reaches thermoforming temperatures, typically of from 140 to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer such as polypropylene, fast plug speeds generally provide the best material distribution in the part.

The shaped laminate is then cooled in the mold. Sufficient cooling to maintain a mold temperature of 30 to 65° C. is desirable. The part is below 90 to 100° C. before ejection in one embodiment. For the good behavior in thermoforming, the lowest melt flow rate polymers are desirable. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150 to 235° C., the feed blocks are from 90 to 250° C., and the water cooling tank-temperatures are from 10 to 40° C.

One embodiment of an injection molding process is described as follows. The shaped laminate is placed into the injection molding tool. The mold is closed and the substrate material is injected into the mold. The substrate material has a melt temperature between 200 and 300° C. in one embodiment and from 215 and 250° C. in another embodiment is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 to 10,400 kPa. The mold is cooled between 10 and 70° C. to cool the substrate. The temperature will depend on the desired gloss and appearance desired. Typical cooling time is from 10 to 30 seconds, depending on part on the thickness. Finally, the mold is opened and the shaped composite article ejected.

Likewise, molded articles may be fabricated by injecting molten polymer into a mold that shapes and solidifies the molten polymer into desirable geometry and thickness of molded articles. Sheet may be made either by extruding a substantially flat profile from a die, onto a chill roll, or alternatively by calendaring. Sheet will generally be considered to have a thickness of from 10 mils to 100 mils (254 µm to 2,540 µm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness of in the range of from 254 µm to 0.5 cm. The pipe will generally be in the range of from 2.54 cm to 254 cm in outside diameter, and have a wall thickness of in the range of from 0.5 cm to 15 cm. Sheet made from the products of an embodiment of a version of the present invention may be used to form containers. Such containers may be formed by thermoforming, solid phase pressure forming, stamping and other shaping techniques. Sheets may also be formed to cover floors or walls or other surfaces.

In an embodiment of thermoforming process, the oven temperature is between 160 and 195° C., the time in the oven between 10 and 20 seconds, and the die temperature, typically a male die, between 10 and 71° C. The final thickness of the cooled (room temperature), shaped laminate is from 10 µm to 6,000 µm in one embodiment, from 200 µm to 6,000 µm in another embodiment, and from 250 µm to 3,000 µm in yet another embodiment, and from 500 µm to 1,550 µm in yet another embodiment, a desirable range being any combination of any upper thickness limit with any lower thickness limit.

In an embodiment of the injection molding process, wherein a substrate material is injection molded into a tool including the shaped laminate, the melt temperature of the substrate material is between 230 and 255° C. in one embodiment, and between 235 and 250° C. In another embodiment, the fill time from 2 to 10 seconds in one embodiment, from 2 to 8 seconds in another embodiment, and a tool temperature of from 25 to 65° C. in one embodiment, and from 27 and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles such as fuel tanks and other fluid containers, playground equipment, outdoor furniture and small enclosed structures. In one embodiment of this process, compositions of this invention are extruded through a multi-layer head, followed by placement of the uncooled laminate into a parison in the mold. The mold, with either male or female patterns inside, is then closed and air is blown into the mold to form the part.

It will be understood by those skilled in the art that the steps outlined above may be varied, depending upon the desired result. For example, an extruded sheet of the compositions of this invention may be directly thermoformed or blow molded without cooling, thus skipping a cooling step. Other parameters may be varied as well in order to achieve a finished composite article having desirable features.

The invention also provides an over-molded article comprising the following: (a) a substrate formed from a composition comprising a polar polymer, and (b) a molded overlay formed from an inventive composition. In one embodiment, the polar polymer is a polycarbonate (PC), ABS, PC/ABS, or nylon. The invention also provides an over-molded article comprising the following: (a) a substrate formed from an inventive composition, and (b) a molded overlay formed from a composition comprising a polar polymer. In one embodiment, the article is in the form of a grip, handle or belt.

The invention further provides for an article where the thermoplastic polyurethane composition is extruded. That is the invention provides for an article which is made by forcing molten TPU through a die to form a shape with a fixed cross-section. Examples include but are not limited to hollow pipes, tubes and straws, solid shapes, such as bars, strands, fibers (and articles made therefrom such as fabrics, thread, yarn string and rope), square, round or other shaped bar stock, decking, planks, lumber and the like. Further examples include but are not limited to sheets and film where they can be used as glass or shield replacements as well as protective films for food and retail packaging, electronic equipment, blister packs, cartons and the like. The invention also provides from articles with long cross-sectional shapes such as gutters, siding, architectural and automotive trim, squeegee and windshield wiper blades and the like. The invention also provides for articles made by an extrusion blow molding process such as bottles and jars. A further example of articles made by an extrusion process.utilizing the TPUs of this invention is insulation for electric wires and cables.

The present invention provides a molded article formed by a TPU composition as described herein. In one embodiment, the molded article comprises a crystalline TPU composition having a high flexural modulus. As used herein, high modulus means a flex modulus of greater than 230,000 psi as measured by ASTM D790. In some embodiments, the crystalline TPU compositions of the present invention have a flexural modulus of about 250,000 psi or higher, or even 300,000 psi or greater as measured by ASTM D790. The crystalline TPU compositions also exhibit melting points of 150° C., or even 175° C. or higher as measured by DSC and/or crystallization temperatures (Tc) in the range of 125° C.-150° C. as measured by DSC and/or storage moduli (G' Modulus) of at least 10 MPa or higher, or even 15 MPa or higher as measured by DMA at 150° C. In one embodiment, the invention comprises a molded article wherein the molded article comprises a thermoplastic polyurethane composition comprising the reaction product of (a) about 5% by weight to about 25% by weight of a polyol component, wherein the polyol has a weight average molecular weight of about 250 to about 3000; (b) about 75% by weight to about 95% by weight of a hard segment component, wherein the hard segment component comprises (i) an aromatic polyisocyanate and (ii) a chain extender comprising an unbranched, unsubstituted, linear chain diol; and (c) optionally, a catalyst wherein the TPU composition has a flexural modulus of at least 230,000 psi, or even at least 250,000 psi, or even at least 300,000 psi as measured by ASTM D790, melting points of 150° C., or even 175° C. or higher as measured by DSC, and/or crystallization temperatures (Tc) in the range of 125° C.-150° C. as measured by DSC, and/or storage moduli (G' Modulus) of at least 10 MPa or higher, or even 15 MPa or higher as measured by DMA at 150° C. In another embodiment, the invention comprises a molded article wherein the molded article comprises a thermoplastic polyurethane composition comprising the reaction product of (a) about 5% by weight to about 25% by weight of a polyol component, wherein the polyol has a weight average molecular weight of about 250 to about 3000; (b) about 75% by weight to about 95% by weight of a hard segment component, wherein the hard segment component comprises (i) an aromatic polyisocyanate and (I) a chain extender comprising an unbranched, unsubstituted, linear chain diol; and (c) optionally, a catalyst, and further comprising short glass fibers wherein the TPU composition has a flexural modulus of at least 500,000 psi, or even 1,000,000 psi or greater as measured by ASTM D790, melting points of 150° C., or even 175° C. or higher as measured by DSC, crystallization temperatures (Tc) in the range of 125° C.-150° C. as measured by DSC, and storage moduli (G' Modulus) of at least 10 MPa or higher, or even 15 MPa or higher as measured by DMA at 150° C. In another embodiment, the invention comprises a molded article comprises a thermoplastic polyurethane composition comprising the reaction product of (a) about 5% by weight to about 25% by weight of a polyol component, wherein the polyol has a weight average molecular weight of about 250 to about 3000; (b) about 75% by weight to about 95% by weight of a hard segment component, wherein the hard segment component comprises (i) an aromatic polyisocyanate and (ii) a chain extender comprising an unbranched, unsubstituted, linear chain diol; and (c) optionally, a catalyst, and further comprising a flame retardant additive, wherein the flame retardant additive comprises an aluminum salt of phosphinic acid represented by the formula: $[R^1R^2P(O)O]^-_3Al^{3+}$, an aluminum salt of diphosphinic acid represented by the formula: $[O(O)PR^1—R^3—PR^2(O)O]^{2-}_3Al^{3+}_2$, a polymer of one or more of the foregoing, or any combination thereof, wherein $R^1$ and $R^2$ are hydrogen and $R^3$ is an alkyl group, and wherein the TPU composition has a flexural modulus of 230,000 psi or greater, or even 250,000 psi or greater, or even 300,000 psi or greater as measured by ASTM D790, melting points of 150° C., or even 175° C. or higher as measured by DSC, crystallization temperatures (Tc) in the range of 125° C.-150° C. as measured by DSC, storage moduli (G' Modulus) of at least 10 MPa or higher, or even 15 MPa or higher as measured by DMA at 150° C., and also has a V0 flame rating with non-dripping properties as measured by UL 94 vertical burn testing. In yet another embodiment, the invention comprises a molded article comprises a thermoplastic polyurethane composition comprising the reaction product of (a) about 5% by weight to about 25% by weight of a polyol component, wherein the polyol has a weight average molecular weight of about 250 to about 3000; (b) about 75% by weight to about 95% by weight of a hard segment component, wherein the hard segment component comprises (i) an aromatic polyisocyanate and (ii) a chain extender comprising an unbranched, unsubstituted, linear chain diol; and (c) optionally, a catalyst, further comprising a flame retardant additive, wherein the flame retardant additive comprises an aluminum salt of phosphinic acid represented by the formula: $[R^1R^2P(O)O]^-_3Al^{3+}$, and aluminum salt of diphosphinic acid represented by the formula: $[O(O)PR^1—R^3—PR^2(O)O]^{2-}_3Al^{3+}_2$, a polymer of one or more of the foregoing, or any combination thereof, wherein $R^1$ and $R^2$ are hydrogen and $R^3$ is an alkyl group, and further comprising short glass fibers, wherein the TPU composition has a flexural modulus of 500,000 psi or greater, or even 1,000,000 psi or greater, as measured by ASTM D790, melting points of 150° C., or even 175° C. or higher as measured by DSC, crystallization temperatures (Tc) in the range of 125° C.-150° C. as measured by DSC, storage moduli (G' Modulus) of at least 10 MPa or higher, or even 15 MPa or higher as measured by DMA at 150° C., and also has a V0 flame rating with non-dripping properties as measured by UL 94 vertical burn testing.

Thermoplastic polyurethane (TPU) compositions described above are highly useful materials that can provide an attractive combination of physical properties. Whether for its outstanding toughness, durability or processing ease, TPU is a versatile material that bridges the gap between rubber and plastics. Accordingly, TPU compositions find use in many different applications.

The compositions of the invention any blends thereof are useful in a wide variety of applications, including transparent articles such as cook and storage ware, and in other articles such as furniture, automotive components, toys, sportswear, medical devices, eyeglasses, such as frames and temple pieces, sterilizable medical devices, sterilization containers, fibers, woven fabrics, nonwoven fabrics, drapes, gowns, filters, hygiene products, diapers, and films, oriented films, sheets, tubes, pipes, wire jacketing, cable jacketing, agricultural films, geomembranes, sporting equipment, cast film, blown film, profiles, boat and water craft components, and other such articles. The compositions are suitable for automotive components such as bumpers, grills, trim parts, dashboards and instrument panels, exterior door and hood components, spoiler, wind screen, windshield wipers, hub caps, mirror housing, body panel, protective side molding, and other interior and external components associated with automobiles, trucks, boats, and other vehicles.

Other useful articles and goods may be formed from the compositions of the invention including: crates, containers, packaging, labware, such as roller bottles for culture growth and media bottles, office floor mats, instrumentation sample holders and sample windows; liquid storage containers such as bags, pouches, and bottles for storage and IV infusion of blood or solutions; packaging material including those for any medical device or drugs including unit-dose or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means such as tubing, hoses, pipes, and such, including liners and/or jackets thereof. In some embodiments, the articles of the invention are fire hoses that include a liner made from the TPU compositions described herein. In some embodiments the, liner is a layer applied to the inner jacket of the fire hose.

Still additional useful articles and goods may be formed from the compositions of the invention including: a sheet, a tape, a carpet, an adhesive, a wire sheath, a cable, a protective apparel, an automotive part, a footwear component, a coating, or a foam laminate, an overmolded article, an automotive skin, an awning, gutters, architectural trim, decking, lumber, a tarp, a leather article, a roofing construction article, a steering wheel, a powder coating, a powder slush molding, a consumer durable, a grip, a handle, a hose, a hose liner, a pipe, a pipe liner, a caster wheel, a skate wheel, a computer component, a belt, an applique, a footwear component, a conveyor or timing belt, a glove (made from one or more of the films described herein, or made from one or more of the fabrics described herein), a fiber, a fabric, or a garment.

The present invention comprises an article made from the thermoplastic polyurethane composition as described herein, wherein the article is a wire jacket, a cable jacket, eyeglass frames, automotive components, and/or medical devices.

These article and/or devices may be made or formed by any useful forming means for forming thermoplastic polyurethane materials. This will include, at least, molding, including compression molding, injection molding, blow molding, and transfer molding; film blowing or casting; extrusion, and thermoforming; as well as by lamination, pultrusion, protrusion, draw reduction, rotational molding, spinbonding, melt spinning, melt blowing; or combinations thereof. Use of at least thermoforming or film applications allows for the possibility of and derivation of benefits from uniaxial or biaxial orientation of the material.

The present invention will be better understood by reference to the following examples, which serve to illustrate the invention, but not to limit the same.

A set of compositions is prepared to demonstrate the benefits of the invention. The formulation of each of the compositions is summarized in the tables below (amounts listed are amounts by weight):

EXAMPLES

TPU compositions were prepared and then tested for flex modulus measured according to ASTM D790. The results are summarized in the Tables 1 and 2 below. Components are listed as percent by weight in the reaction mixture.

TABLE 1

| | Comparative Examples | | | | |
|---|---|---|---|---|---|
| | C1 | C2 | C3 | C4 | C5 |
| PTMEG (1000 MW) | 37 | 30 | | | |
| BDOAdipate (3000 MW) | | | 41 | | |
| BDOAdipate (4200 MW) | | | | 41 | |
| MDI | 48 | 53 | 44 | 44 | 63 |
| 1,4BDO | 13 | 14 | 13 | 15 | |
| DPG | 2 | 3 | 2 | | |
| CHDM | | | | | 36 |
| Additives | | | | | 1 |
| Flex Modulus (ASTM D790) | 20000 | 22900 | 20300 | 34000 | 329000 |
| Storage Modulus (MPa) Dynamic Mechanical Analysis (at 150° C.) | 5 | 6 | 5.27 | | 3.9 |

None of these TPU materials were crystalline or crystallizable upon heating.

TABLE 2

| | Inventive Examples | | | | |
|---|---|---|---|---|---|
| | 1 | 2 | 3 | 4 | 5 |
| PTMEG (250 MW) | 5 | | 10 | | |
| PTMEG (1000 MW) | | | | 10 | |
| PTMEG (2000 MW) | | 10 | | | |
| BDO-Adipate (700 MW) | | | | | 20 |
| MDI | 71 | 67 | 69 | 67 | 61 |
| 1,4BDO | 24 | 23 | 21 | 23 | 19 |
| Flex Modulus ASTM D790 | 347525 | 308456 | 337032 | 334682 | 341160 |
| Storage Modulus (MPa) DMA (at 150° C.) | 25.1 | 22.4 | 16.3 | 23.2 | 17.4 |
| Tc (° C.) (by DSC) | 143 | 145 | 138 | 139 | 126 |
| Tm (° C.) (by DSC) | 219 | 194/216 | 209 | 192/215 | 180 |

As shown above, the inventive compositions result in TPUs having unexpectedly higher flexural modulus as measured by ASTM D790 than the comparative examples. In addition, all of these materials produced crystalline or crystallizable thermoplastic polyurethane compositions.

Inventive Example 5 and Comparative Example C4 were both compounded with short glass fibers to prepare Comparative Examples C6, C7, and C8, and Inventive Examples 6, 7, and 8. The flex modulus was measured according to ASTM D790. The results are summarized in Table 3.

TABLE 3

|  | C6 | C7 | C8 | 6 | 7 | 8 |
|---|---|---|---|---|---|---|
| TPU of Example C4 (Wt %) | 100 | 70 | 50 | | | |
| TPU of Example 5 (Wt %) | | | | 100 | 70 | 50 |
| Short Glass Fiber (Wt %) | | 30 | 50 | | 30 | 50 |
| Flex Modulus ASTM D790 | 34000 | 362000 | 650000 | 343374[1] | 1144482 | 1790004 |

[1]Example 6 exhibits a slightly different Flex Modulus from Example 5 above because it was passed through the compounding extruder, which slightly increased the Flex Modulus.

TPU compositions in accordance with the present invention, when compounded with short glass fibers achieve unexpectedly higher flex modulus than other TPU compositions.

Dog bone samples made from Comparative Example C5 and Inventive Example 5 were exposed to high temperatures (159° C. and 189° C.) for 3 days and were submerged for 7 days at 150° C. in various fluids. After exposure, Comparisons of the dog bones were made. The results are summarized in Table 4.

TABLE 4

|  | C5 | Inventive Example 5 |
|---|---|---|
| 3 days at 159° C. | Completely melted and fused | No change |
| 3 days at 189° C. | Completely melted and fused | Slight discoloration, no melting or fusion |
| 7 days at 150° C. in presence of automotive gear oil | Disintegrated, could not be tested | Maintained > 80% of original yield strain and yield elongation |
| 7 days at 150° C. in presence of lubricating fluid for off highway vehicles | Disintegrated, could not be tested | Maintained 100% of original yield strain and yield elongation |

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about". Except where otherwise indicated, all numerical quantities in the description specifying amounts or ratios of materials are on a weight basis. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration. In addition, as used herein, unless otherwise specified, the expression "substantially free of" means an amount that does not materially affect the basic and novel characteristics of the composition under consideration, for example, in some embodiments it may mean no more than 5%, 4%, 3%, 2%, 1%, 0.5%, or even 0.1% by weight of the composition in question, in still other embodiments, it may mean that less than 1,000 ppm, 500 ppm, or even 100 ppm of the material in question is present.

What is claimed is:

1. An article comprising:
a crystalline thermoplastic polyurethane composition, comprising a reaction product of:
(a) about 5% by weight to about 25% by weight of a polyol component, wherein the polyol has a weight average molecular weight of about 250 to about 3000;
(b) about 75% to about 95% by weight of a hard segment component, wherein the hard segment component comprises (i) an aromatic polyisocyanate and (ii) a chain extender comprising an unbranched, unsubstituted, linear chain diol, wherein the crystalline thermoplastic polyurethane composition further comprises short glass fibers and wherein the crystalline thermoplastic polyurethane composition has a flexural modulus of 1,000,000 psi or greater as measured by ASTM D790.

2. The article of claim 1 wherein the polyol component comprises a hydroxyl terminated polyester having a weight average molecular weight of 400 to 1000.

3. The article of claim 2 wherein the crystalline thermoplastic polyurethane composition comprises 20% by weight of the hydroxyl terminated polyester and the hydroxyl terminated polyester is butane diol-adipate.

4. The article of claim 1 wherein the polyol component comprises a hydroxyl terminated polyether having a weight average molecular weight of 250 to 2000.

5. The article of claim 4 wherein the crystalline thermoplastic polyurethane composition comprises 5% to 10% by weight of the hydroxyl terminated polyether and the hydroxyl terminated polyether is poly(tetramethylene glycol) ether.

6. The article of claim 1 wherein the chain extender comprises 1,4 butanediol.

7. The article of claim 1, wherein the crystalline thermoplastic polyurethane composition further comprises a flame-retardant additive and wherein the composition has at least a V1 flame rating with non-dripping properties as measured by UL 94 vertical burn testing.

8. The article of claim 7, wherein the flame-retardant additive comprises an aluminum salt of phosphinic acid represented by the formula: [R1R2P(O)O]-3Al3+, an aluminum salt of diphosphinic acid represented by the formula: [O(O)PR1-R3-PR2(O)O]2−3Al3+2, a polymer of one or more of the foregoing, or any combination thereof, wherein R1 and R2 are hydrogen and R3 is an alkylene group.

9. The article of claim 1, wherein the article is made by molding, extruding, or thermoforming.

10. The article of claim 1, wherein the article is a wire jacket, a cable jacket, an eyeglass frame, an automotive component, or a medical device.

* * * * *